United States Patent
Noth et al.

(10) Patent No.: US 8,473,251 B1
(45) Date of Patent: Jun. 25, 2013

(54) COLLECTING APPLICATION CRASHES ON RESOURCE-CONSTRAINED DEVICES

(75) Inventors: Michael Noth, Bothell, WA (US); Jessica Lynn Gray, Seattle, WA (US); Carlos Valdivia, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/475,761

(22) Filed: May 18, 2012

(51) Int. Cl.
*G06F 11/30* (2006.01)

(52) U.S. Cl.
USPC .......................................... 702/183

(58) Field of Classification Search
USPC .............. 702/182, 183, 185; 714/22, 24, 38.1
See application file for complete search history.

(56) References Cited

U.S. PATENT DOCUMENTS 7,293,201 B2 * 11/2007 Ansari ........................ 714/38.14
2010/0107145 A1 * 4/2010 Warren et al. ................. 717/131

* cited by examiner

*Primary Examiner* — Aditya Bhat
(74) *Attorney, Agent, or Firm* — McDermott Will & Emery LLP

(57) ABSTRACT

The subject matter of this specification can be implemented in, among other things, a method for crash reporting for resource-constrained devices. The method includes a step for accessing one or more rules for crash data management upon an application crash on a resource-constrained device. The one or more accessed rules take into account at least one resource constraint of the resource-constrained device. The method also includes a step for collecting crash data and communicating the crash data to a crash report management system. Either or both the collecting or the communicating of the crash data is based on the one or more accessed rules.

18 Claims, 5 Drawing Sheets

COLLECTING APPLICATION CRASHES ON RESOURCE-CONSTRAINED DEVICES

FIELD

This instant specification relates to crash management systems, in particular for resource constrained-devices.

BACKGROUND

Software systems may require collection of crash data upon an application or system crash. Crash data may include application state immediately prior to the crash, CPU state (registers, etc), stack traces, memory snapshot (heap), as well as metadata including application name, version, machine information, etc. Collected crash data may then be used to debug problems with a particular application or system and to make appropriate fixes to an application or system component.

SUMMARY

In one aspect, the disclosed subject matter relates to a method for crash reporting for resource-constrained devices. In one aspect, a method includes a step for accessing one or more rules for crash data management upon an application crash on a resource-constrained device, wherein the one or more accessed rules take into account at least one resource constraint of the resource-constrained device. The method also includes a step for collecting crash data and a step for communicating the crash data to a crash report management system, wherein at least one of the collecting the crash data or the communicating the crash data is based on the one or more accessed rules. Other aspects can include corresponding systems, apparatus and computer program products.

In another aspect, the disclosed subject matter further relates to a non-transitory computer-readable medium. The computer-readable medium includes instructions that, when executed by a computer, cause the computer to implement a method for crash reporting for resource-constrained devices. The instructions include code for providing one or more rules to a resource-constrained device for an application crash associated with an application running on the resource-constrained device. The instructions also include code for receiving crash data from the resource-constrained device, wherein the received crash data was collected or communicated by the resource-constrained device based on at least one of the one or more rules provided to the resource-constrained device. Other aspects can include corresponding systems, apparatus, and methods.

The disclosed subject matter further relates to a system for crash reporting for resource-constrained devices. The system includes one or more processors and a memory including instructions which, when executed by the one or more processors cause the one or more processors to collect crash data upon an application crash. The instructions also cause the one or more processors to access a rule for handling a crash on a resource-constrained device, wherein the accessed rule provides a communication rule based on at least one resource constraint of the resource-constrained device and to communicate at least a portion of the collected crash data to a crash report management system based on the accessed rule. Other aspects can include corresponding systems, apparatus, and methods.

The details of one or more implementations are set forth in the accompanying drawings and the description below. Other features and advantages will be apparent from the description and drawings, and from the claims.

DETAILED DESCRIPTION

Figure 1:
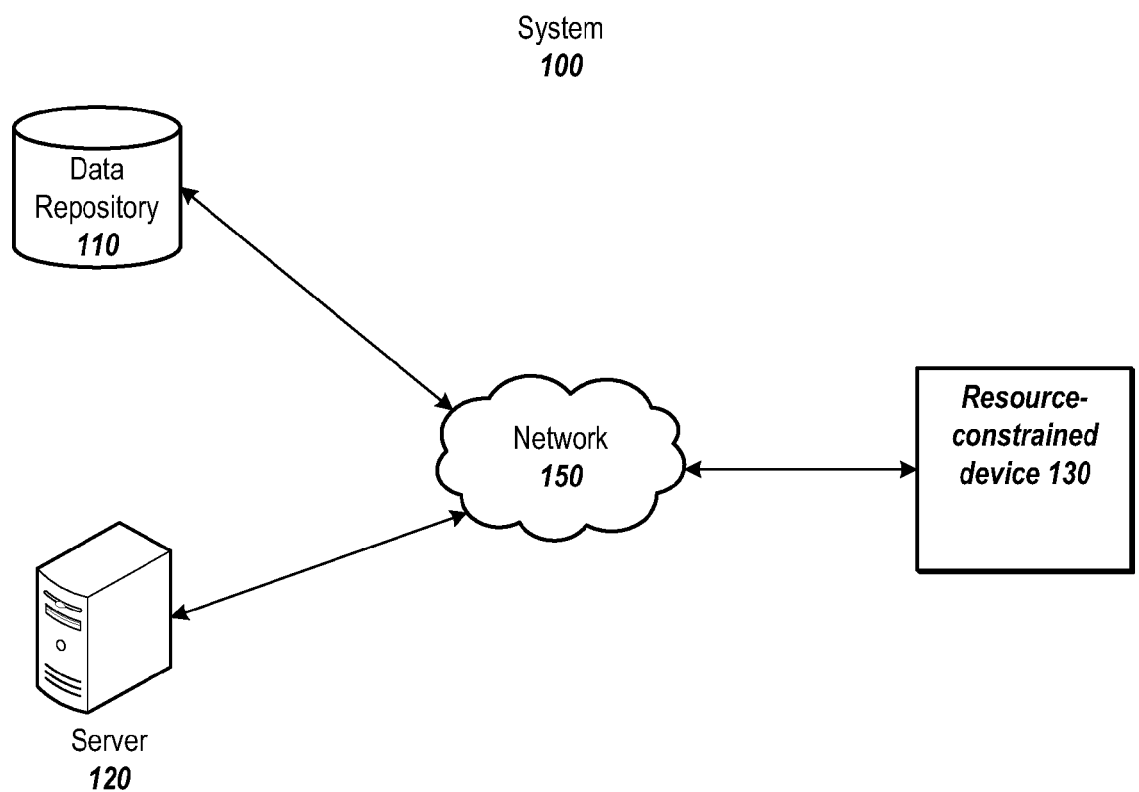
FIG. 1 is a schematic diagram that shows an example of a crash management system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Software systems may require collection of system and application information upon an application or system crash. Such crash data may be collected by a crash report collection system (CRC system). The collected crash data (e.g., in the form of a crash report) may be communicated to a crash report management system (CRM system) for software debugging, maintenance, or other purposes. An application is considered to crash when it executes an illegal operation, exhausts some resource, or otherwise fails. In addition, crashes may include any unusual conditions (e.g., slowdown or non-fatal errors) that would benefit from monitoring and reporting.

A crash report may be generated upon detection of application failure. A crash report may be a file or any other form (e.g., data objects, database rows, etc.) of collection of data capturing relevant information about an application or system crash. Relevant information may include application state immediately prior to the crash, CPU state (registers, etc), stack traces, memory snapshot (heap), as well as metadata including application name, version, machine information, and other information as requested by an application developer and/or desired by a crash-reporting system. On some devices, CPU state may be the state of one or more physical CPUs, and/or the state of one or more virtual CPUs such as the state of a virtual machine on which the application is running.

Collection of relevant data (e.g., by a CRC system) and communication of relevant data to a CRM system may be particularly complex on resource-constrained devices (RCDs). A resource-constrained device may be devices such as, a mobile or smart phone, a portable device, a wearable device, or a medical device implanted or partially implanted on a person requiring critical crash reporting and yet being quite resource-constrained, or any device that runs instructions in software or hardware and is limited in one or more resources such as power, computation ability, network bandwidth, user attention, memory, etc.

The subject disclosure provides for collection and communication of crash data for resource-constrained devices. For example, one goal is to more effectively or optimally use the constrained resources in making decisions for what and how much data to collect for crashes, when and how to communicate crash data to a crash report management (CRM) system, and what actions to take on the resource-constrained device to better use its resources. Optimal use of constrained resources does not mean a global optimization. Rather, optimal uses include any improvements on using constrained resources for crash data management as compared to systems that are not aware of the constraints on the constrained resources.

In various aspects, systems and methods are provided for crash data collection and communication for resource-constrained devices that use one or more rules in determining what and how much data to collect upon a crash and/or in determining what, when, how much, and using what channel collected crash data is to be communicated to a CRM system. The one or more rules may be based on one or more resource constraints of resource-constrained devices. The one or more rules may be associated with an application running on the resource-constrained device(s), the operating system of the device, a subsystem of the device, or the device as a whole.

In some aspects, crash reporting systems provide and use pre-emptive or adaptive filtering rules for crash data collection and communications. For example, a pre-emptive or adaptive filtering rule may analyze historical crash records, that may or may not be specific to an application for a resource-constrained device, in making decisions about crash data collection and/or crash data communication to a CRM system.

In some implementations, rules may take into account a particular constrained resource of devices. For examples, some rules may take into account power resource constraints of a device in deciding what to collect and/or communicate—crash reporting decisions. Other resource-based rules may take into account network bandwidth availability, connectivity, intermittent connectivity, or bandwidth cost to a user into account when making crash reporting decisions. Yet other rules may take into account memory constraints of a device. Some rules may also take into account the user-attention levels of a resource-constrained device into account for crash reporting decisions.

In some implementations, a CRM system may provide feedback to a reporting RCD or CRC system based on analysis of a current crash report or previous crash report(s) from one or more reporting RCDs. In some aspects, an RCD or CRC that receives feedback from a CRM system may take an action based on the received feedback or instructions. In some aspects of crash reporting, crash reports or data may be supplied to third parties that may be interested in such information.

FIG. 1 illustrates an example of a computer system 100 configured for crash management systems for resource-constrained devices. As shown, the computer system 100 includes a data repository 110, a server 120, a resource-constrained device 130. Data repository 110, although shown as a database, may be any other type of data repository (e.g., a relational database, an object-oriented database, a web application server, a file, or any other data storage) that can maintain and provide data crash management systems. The data repository 110, the server 120, and the resource-constrained device 140 may be configured to communicate with one another via a network 150. The network 150 may include the Internet, an intranet, a local area network, a wide area network, a wired network, a wireless network, a cellular network, a WiFi network, or a virtual private network (VPN).

The data repository 110 may store data (e.g., rules for crash data collection, crash reports or data received from devices, etc.) related to a crash management system. The database may include a single machine, multiple machines, a single processor system, or a multi-processor system.

The server 120 may include a module for crash report management and a module for crash data rules (e.g., for selection of two faces for virtual gluing or for tab placement). The server 120 may be implemented as a single machine with a single processor, a multi-processor machine, or multiple machines with multiple processors. One example of the server 120 is described in more detail in conjunction with FIG. 2 below.

The resource-constrained device 130 may be a mobile or smart phone, a portable device, a wearable device, a medical device implanted or partially implanted on a person, a personal digital assistant (PDA), a tablet computer, a netbook, or a laptop computer or any computing device that is constrained in one or more of resources such as power, computation ability, network bandwidth, user attention, memory, etc. The resource-constrained device 130 may be portable and may be carried by a user, for example, in a pocket, a purse, a backpack, or a briefcase. A medical device example of an RCD may be an insulin pump or a pacemaker. A medical device may be resource constrained due to the desire to keep its size small and to minimize maintenance (e.g., due to changing batteries). A medical device may require crash reporting by virtue of it running software (e.g., on a CPU or firmware).

While only one resource-constrained device 130 is illustrated in FIG. 1, the subject technology may be implemented in conjunction with one or more resource-constrained devices 130. Resource-constrained device 130 may be configured for a crash collection module and a client rules module. One example of the resource-constrained device 130 is described in more detail in conjunction with FIG. 2 below.

While each of the data repository 110, the server 120, the mobile device 130, and the computing device 140 are illustrated in FIG. 1 as separate machines, in example aspects, one or more of the data repository 110, the server 120, the mobile device 130, and the computing device 140 may be implemented as a single machine. For example, the functions of the data repository 110 and the server 120 may be implemented within a single machine.

Figure 2:
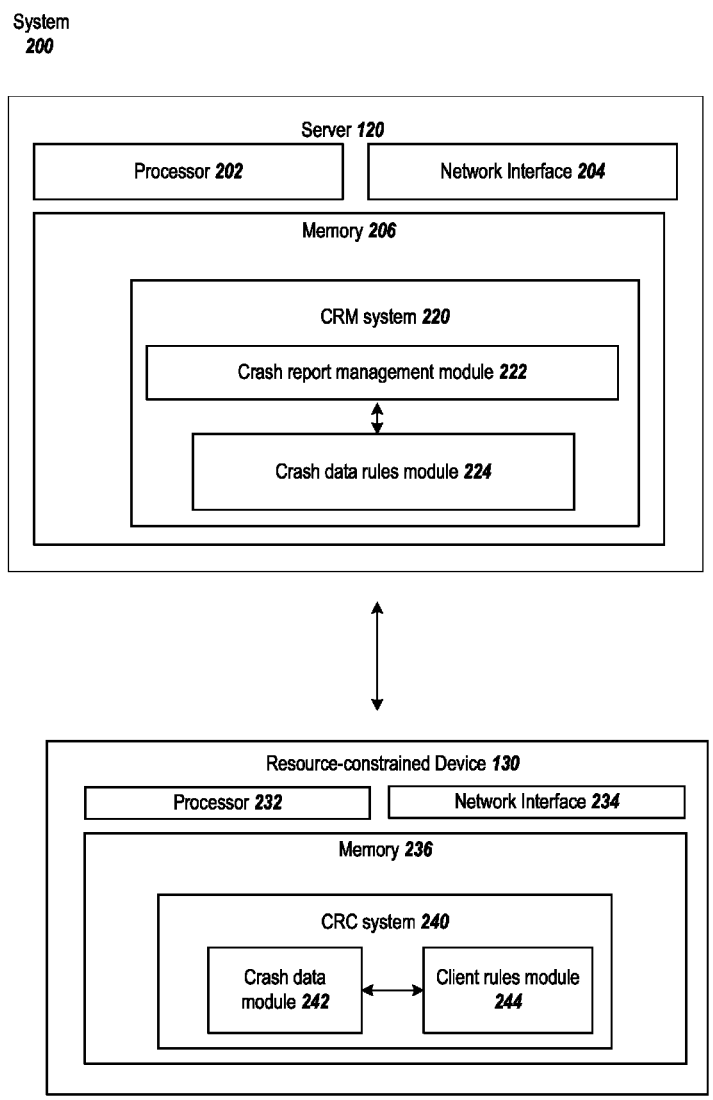
FIG. 2 illustrates an example of the server and resource-constrained device of FIG. 1 in more detail.

FIG. 2 illustrates an example of the server 120 of FIG. 1 in more detail. As shown, the server 120 includes a processor 202, a network interface 204, and a memory 206. The processor 202 is configured to execute computer instructions that are stored in a computer-readable medium, for example, the memory 206. The processor 202 may be a central processing unit (CPU). While only one processor 202 is illustrated, the server 120 may include multiple processors. Furthermore, while the server 120 is illustrated as a single machine, the server 120 may include multiple machines, e.g., within a server farm. The network interface 204 is configured to allow the server 120 to transmit and receive data in a network, e.g., network 150 of FIG. 1. The network interface 204 may include one or more network interface cards (NICs). The memory 206 may store data or instructions. As illustrated, the memory 206 includes a model construction module 210 and an optimization module 220, which are implemented by processor 202 executing one or more sequences of instructions stored in memory 206.

Regarding collecting and communicating crash data, server 120 of system 200 illustrates a CRM system 220 with a crash report management module 222 and a crash data rules module 224. The resource-constrained device 130 of system 200 illustrates a CRC system 240 with a crash data module 242 and a client rules module 244. Crash report management module 22 may be configured to communicate with crash data module 242 to receive crash reports and/or to provide feedback or instructions to crash data module 242 based on received crash reports or data. Crash data rules module 224 may be configured to communicate with client rules module 244 to provide crash reporting rules to it (e.g., previous crash reporting rules, either system or user defined) or to receive crash reporting rules from it (e.g., a new user rule, a modification of a user rule).

The crash report management module 222 may be configured to facilitate receiving, from one or more resource-constrained devices (e.g., device 130 and other such devices), crash reports or crash data. Crash report management module 222 may receive crash data or reports from one or more crash data modules 242 running on resource-constrained devices 130. A crash report may be a file or any crash data captured in an other form. Crash reports may be about application or system failures. The type of information captured upon a crash may include application state immediately prior to the crash, CPU state (registers, etc), stack traces, memory snapshot (heap), as well as metadata including application name, version, machine information, and other information as requested by an application developer and/or desired by a crash-reporting system. On some devices, CPU state may be the state of one or more physical CPUs, and/or the state of one or more virtual CPUs such as the state of a virtual machine on which the application is running.

Crash reporting management system 220 may provide feedback to a reporting RCD 130 or CRC system 240 based on analysis of a current crash report or previous crash reports from one or more reporting RCDs. For example, a CRM system 220 may take crash reports from a plurality of reporting RCDs, analyze a pattern over a certain time frame and determine that a particular network channel is either leading to too much power consumption or bandwidth utilization. As a result, the CRM system 220 may instruct or suggest to one or more RCDs to not utilize such a network channel (e.g., providing an alternative in the instruction).

In another case, the CRM system 220 may suggest to one or more RCDs to either turn off or to disable certain services for power savings purposes. CRM provided instructions may or many not require user interaction before taking effect. The CRM system 220 may also make suggestions to a CRC system 240 to capture certain types of data for crashes (e.g., either for certain apps or for all apps running on an RCD, etc.). Based on feedback from a CRM system 220, a CRC system 240 may make appropriate modifications on the device or in the CRC system 240 to take a suggested action.

In some aspects, crash reports may be provided to crash reporting management system 220 upon a request initiated by crash reporting management module 220, a server-initiated request for crash data or reports. For example, crash report management module may send a request or instruction for aggregate counts of application crashes over a certain period of time to one or more RCDs (e.g., to a corresponding crash data module 242 per RCD). The one or more RCDs receiving such a request for crash data may then respond by providing the requested crash data to crash report management module 222.

A server-initiated request for crash data or reports may include, with the request, one or more rules to apply to crash data collection or communication along with the request. In some implementations, a server-initiated request may only supply the request for crash data, and the rules for collecting and communicated crash data for the request may be accessed from a CRC system 240 on the respective RCD (e.g., via the client rules modules 244). In yet other aspects, a server-initiated request for crash data may include one or more rules in the request and one or more rules accessed locally from the client rules module 244, running on the respective RCD.

Crash report management module 222 may provide rules to CRC system 240 to make decisions about crash data collection and communication, for example via crash data rules module 224 sending the rules to client rules modules 244. Crash report management module 222 may modify or provide new rules based on received crash reports from one or more RCDs. The rules may be a one time rule (e.g., do a particular action based on a current or previous crash report), or a longer term rule (e.g., based on previous crashes, CRM system 220 may determine a useful crash collection rule for a specific application or type of device).

Crash data module 242 of CRC system 240 may be configured to provide crash reports to crash report management module 222 of CRM system 220. Crash data module 242 may also be configured to collect crash data upon application or system crashes. Crash data module 242 may communicate with client rules module 244 to obtain rules as to what and how much data to capture, and to make decisions about when, what, and how much data to communicate to crash report management module 222. CRC system 240 may be influenced by CRM system 220 in making collection and reporting decisions (e.g., by CRM system 220 providing rules to CRC system 240 or by providing instructions in a more realtime fashion based on receiving of one or more crash reports either from one or more RCDs).

Client rules module 244 may be configured to maintain a set of rules for crash data collection and communication, upon a crash on RCD 130. Client rules modules 244 may be configured to receive some rules from crash data rules module 224. Client rules module 244 may also be configured to receive rules from any other source (e.g., user configured or provided, rules provided as part of client rules module 244, provided by RCD 130, provided by other CRM systems, rules generated from machine learning or other statistical analyses, provided by developers of crash reporting systems, from a device or device manufacturer or device operating system manufacturer, etc.)

The rules may be system or user configured/provided. The rules may be used in making decisions about what, how much, or in what format crash data should be collected upon a crash. The rules may be used in making decisions about what, how much, what format, or using what network channel should crash data be communicated to a CRM system. The rules may be specific to an application, to a device, to a device type, to particular resource capabilities on a device, may be based on previous crash reports from a particular device or a set of devices (e.g., from a region, from a type of devices), etc. The below descriptions provide various types of rules that may be used for making crash data collection and communication decisions on resource-constrained devices by a CRC system 240.

In example aspects, pre-emptive and adaptive filtering crash reporting rules are provided. Pre-emptive and adaptive filtering of what and how much crash data to collect may help in optimal resource utilization. When a crash occurs, the CRC system 240 (e.g., using crash data module 242 and client rules module 244) may decide what if any additional information needs to be gathered based on analysis of historical crash records or data it has access to. Historical crash records may be maintained by crash data module 242 or may be provided to CRC system 240 by CRM system 220. In one aspect, the CRC system 240 may examine application crash records for a particular application (e.g., how many times has the particular application crashed over some time window). Based on the analysis the CRC system 240 may communicate only some of the crashes to CRM system 220. For example, where the CRC system detects repeated crashes of the same application, the CRC system 240 may decide to report only the first few crashes, while ignoring or discarding subsequent crashes of that application.

In another aspect, crash records may be examined for a particular device (e.g., how many times has any application crashed over some time window and how many crashes have been transmitted by this device over some time window) and modify crash data collection based on the analysis. For example, where many application crashes are detected frequently (e.g., on a device that got wet and is suffering hardware failure), the CRC system 240 may decide to report only global counts of all crashes instead of each individual crash to CRM system 220.

The rules for the analysis of adaptive filtering (e.g., per-application or per-device crash analysis) may be provided to a client rules module 244 of CRC system 240 by a crash data rules module 224 of CRM system 220. The CRC system 240 may receive information from remote CRM system 220 that instruct it to try to gather more or less information under some circumstances. For example, the CRM system 220 may determine that a particular crash is "uninteresting" and future crashes of the same version of the same application should be ignored. As such CRM system 220 may instruct a CRC system 240 to not report such "uninteresting" crashes in the future.

In some aspects, power-aware crash reporting rules are provided. Power-aware crash reporting decisions may make better usage of resources on a resource-constrained device. Certain operations require different amounts of power utilization. For example, reading all memory associated with an application typically requires more power than reading only the processor state. Application characteristics may influence the amount of power required even for gathering the "same kind" of information, and a CRC system 240 may take this into account. For example, a multimedia-rich application may make use of specialized resources that require additional power when crash-relevant data is extracted from them, such as reading the RAM associated with a display (e.g., to capture a screen shots), extracting network or wireless radio state, etc. Increased power usage may also apply to extracting other kinds of data to include in a crash report, such as application or system log data that may have to be read off of a solid-state or other hard drive with different power requirements than reading data from RAM.

In one aspect, where power is particularly constrained, the CRC system 240 may decide to terminate crashing applications immediately and bypass all further attempts at crash collection for terminated applications. In the case where a CRC system 240 of RCD 130 contains specialized low-power hardware, such a termination action may result in substantial power savings. The CRC system 240 may decide to terminate crashing applications, based on a rule provided to it, for example, to client rules module 244 by crash data rules module 224 of CRM system 220. The rule may be specific to types of device.

Communication of crash report data to CRM system 220 typically requires use of a network connection. Often on resource-constrained devices (RCDs), crash reporting requires activating or using an antenna or radio of some kind (e.g., a wireless radio or 3G radio for a mobile data connection). Different transmittal or data communication mechanisms typically have different power consumption levels. In one aspect, the CRC system 240 may consider different power consumption levels for different communication mechanisms in deciding when and how much data to communicate to a CRM system 220. For example, the CRC system 240 may choose to transmit over wireless networks where such transmission uses less power (even where such transmission results in delayed transmission of crash reports).

In another aspect, the CRC system 240 may make tradeoffs between power required to post-process a crash report and the cost of transmitting the report using different transmission mechanisms. For example, the CRC system 240 may choose to use a power-intensive algorithm to compress a crash report versus transmitting a larger amount of uncompressed data when the CRC system 240 has detected a need to save on transmission power requirements. Also, the decision to use power-intensive algorithm to compress data may help save power in transmitting data, possibly by allowing different transmission mechanisms to be used (e.g., data packets over an internet connection versus sending data over SMS), in addition to requiring use of the transmitter for less time or at a lower frequency.

In some aspects, network-aware crash reporting rules are provided. Transmission of a crash report typically requires access to some form of a network (e.g., the internet). A resource-constrained device (RCD) may be constrained in terms of network bandwidth, such as operating in a very-low-bandwidth mode due to poor connectivity or power constraints. The CRC system 240 may take into account a network-aware rule based on bandwidth availability, connectivity, or cost when making crash reporting decisions. For example, the CRC system 240 may choose to defer transmission of a report in circumstances where bandwidth is scarce, or the CRC system 240 may be more aggressive where it determines a crash report is particularly important (e.g., where CRM system 220 previously communicated to the RCD to obtain more data about a particular kind of crash).

The CRC system 240 may take past, current, and/or estimated future network resources of the RCD into account when deciding how to handle or when to transmit crash data. For example, the CRC system 240 may determine that an RCD is being used for videoconferencing (a latency-sensitive high bandwidth activity) and choose to defer transmitting a report. In another case, the CRC system 240 may determine that certain wireless networks have much higher or lower bandwidth than others and choose to transmit over the one with the higher bandwidth.

The CRC system 240 may attempt to conserve network resources under some circumstances by reducing the amount of information it sends, and/or by changing how the data is structured. For example, it may send a tiny "ping" containing only application name, version, and time, and then send minimal device state (e.g., CPU and stack traces) when more bandwidth is available, and send a comprehensive report later still. When sending structured data, the CRC system 240 may negotiate with the server and change what it sends; for example, in the previous example a CRM server 120 may tell the CRC system 240 not to send anything else after it sends the "ping". In some instances, a CRM server 120 may elicit accumulated crash reports from the device.

Users of RCD's may provide user preferences for crash reporting. A user may configure crash reporting preferences for example due to concerns about latency or monetary cost for crash reporting. The CRC system 240 may take use preferences into account when making crash reporting decisions. For example, to save money on mobile data costs, a user may instruct the CRC system 240 to only transmit reports over a wireless network and never over a mobile data network. A CRC system 240 may override user preferences as required by a crash reporting system 220. For example, a user preference may have to be overridden in the case where a particularly severe system or application problem needs to be reported (e.g., the RCD is about to crash in a way to cause loss of data or long-term device impairment).

Resource-constrained devices are often severely constrained in terms of memory (both RAM and more persistent storage such as flash or disk). The CRC system 240 may use information about device memory state to determine whether to capture a crash report, how much information to gather, and when to delete old crash reports. For example, the CRC system 240 may have a preset or user-defined storage limit of, e.g., "No more than 10 MB of crash reports". The CRC system 240 may take such limits into account for deciding on crash reporting. For example, once a limit is approached the CRC system 240 may decide to delete old reports to make more space for newer crash reports. In another case, the CRC system 240 may choose to not gather a full memory (heap) dump of an application based on the provided space limits.

Once a space limit is approached, the CRC system 240 may decided to summarize or otherwise aggregate data from past crashes. CRC system 240 may choose to be more aggressive about sending old crash reports, or choose to stop collecting new crashes until the old ones have been sent or otherwise dealt with.

Resource-constrained devices are often constrained in the amount of a user's attention they can get. The CRC system 240 may take user attention into account where user attention is requested or required. For example, certain kinds of crash reports may require explicit approval from the user (e.g., obtaining the comprehensive state of the RCD that may include sensitive personal information). Where the RCD is in a "sleep" or "quiet" mode, the CRC system 240 may choose to keep the crashing application suspended until the device "wakes up" and the user can be prompted. The CRC system 240 may choose to notify the user in a non-visual way such as a vibration or sound. The CRC system 240 may take explicit user preferences into account (e.g., "always vibrate and get confirmation before sending a crash report for this application"). User preferences may be set at a device level ("never vibrate"), or specific to the crash reporting system ("always beep when a crash occurs"), or at a per-application basis ("ignore crashes from this app").

An RCD may have limited visual real estate to use for getting the user's attention. For example, if an unrelated application crashes while the user is watching a movie on the RCD, the CRC system 240 may choose to skip any visual notification and instead use another form. In other circumstances, the CRC system 240 may display an icon or other indicator on the device, such as a special symbol in a status display area. The CRC system 240 may be able to display a notification via a pop-up style window, or by taking control of the entire display.

CRM system 220 may also be configured to provide crash reports or data to third parties that may be interested in such reports. For example, a medical device manufacturer may need access to crash data for future development and fixes of a medical device reporting crashes. The crash reports may be scrubbed of personal information before providing them to third parties. Scrubbing of personal information may be at different levels based on user authorization or preferences and/or based on the type of entity the report is being sent to (internal or to a third party).

The rules used by CRM system 220 or CRC system 240 for crash reporting may be updated. In some cases, a rule may be added by a system administrator of the crash reporting system 200. In other cases, rules may be added or updated based on analysis of previous crash reports (e.g., the CRM system 220 may learn from prior reports and system, application, network, power, memory, virtual system or device behavior). Such rules may reside in a database or in a crash reporting system module. The rules may be user-specified. Crash reporting rules may be application specific or device-specific or globally applicable.

In some aspects, a rule accessible for crash data collection or communication may not be based on a resource constraint of the resource-constrained device. Rules may be generated through machine learning or other statistical analyses. Rules may be provided by an end-user of the device, e.g., a user may supply a rule that states to never supply crash data for a particular application's crashes. Rules may be provided by a developer of an application, e.g., a developer rule may state when the application crashes, include full memory contents in the crash report. Rules may come from a device or a device operating system manufacturer, e.g., a rule may state send total crash counts per application to the device or operating system manufacturer.

CRC system 240 may also be configured to retrieve updates from, e.g., a CRM system 220. Updates that are retrieved may include fetching updates from the CRM 220 (e.g., instructions or rules on how to handle future crashes). As such, communications between CRC system 240 and CRM system 220 for purposes other than communicating crash reports, also may require data communication concerns for resource-constrained devices. In some aspects, one or more of the rules discussed above in relation to crash data collection and communication may also apply for other communications between RCDs and CRM systems, e.g., for fetching updates to rules and instruction for crash report management.

Crash reporting modules (e.g., the CRC system 40) may be constantly running in the background of an RCD 130. A CRC system 240 may instead be invoked upon a particular application or system crash. The logic or functionality of a CRC system may reside in a package that is utilized by one or more applications, thereby sharing the CRC system functionality across a host of applications. A crash reporting system 200 may exist at a hardware or operating system level.

Crash reporting may be provided for resource-constrained devices that uses "virtual CPUs". For example, a particular application may be a thin client of some sort where all the processing logic is done by a remote server. It may be a medical device that is implanted on a person and monitors certain signals, for which the processing of the signals is done on a remote server. Crash reporting may report on such devices and virtual CPUs and other resources such devices use.

While system 200, comprising of illustrated modules of a CRM system 220 and a CRC system 240 have been described, any set of combinations of modules may be implemented without deviating from the scope of this disclosure. For example, crash report management modules 22 and 224 of CRM system 220 may be one module or may be a set of modules. Crash data module 242 and client rules module 244 of CRC system 220 may be one module or a set of modules. The functionality described for the modules may be executed in any order and may be executed by modules other than those described.

Either CRM system 220 and/or CRC system 240 may communicate with a data repository 110. CRM system 220 may reside on one server 120 or on a set of servers or virtual machines. CRC system 220 may run on an RCD or may run partially on an RCD and partially on other computing devices (e.g., parts of the CRC system may reside on other servers managing parts of crash reporting). As such system 200 is one example of a crash reporting system for resource-constrained devices.

Figure 3:
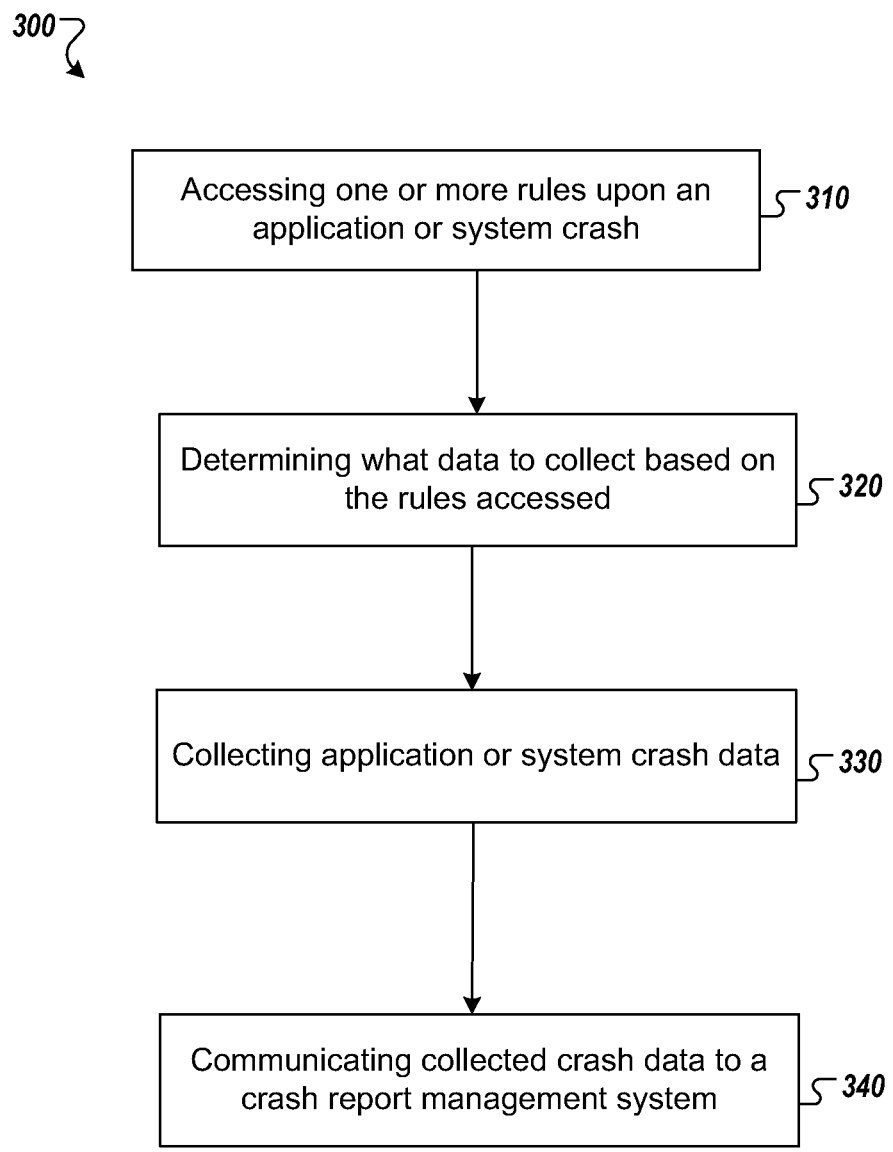
FIG. 3 is a flow chart that shows an example of a process for crash data collection on resource-constrained devices.

FIG. 3 is a flow chart that shows an example of a process 300 for crash data collection on resource-constrained devices. Process 300 is associated with a CRC system, for example a CRC system 240 of crash reporting system 200. However, process 300 is not limited to such a system/configuration. At step 310, CRC system accesses one or more rules upon an application or system crash. The rules may be locally available for example via a client rules module 244 of CRC system 240 of system 200. The rules may instead be accessed by querying a local or remote data repository, e.g., data repository 110. The rules may be provided to CRC system by, for example, a CRM system 220. The rules may be installed on an RCD on which the CRC system is operating. The rules may be provided by a user or system. The rules accessed may also change based on previous crash reports.

At step 320, process 300 determines what data to collect based on the rules accessed at step 310. Only a subset of the rules accessed in step 310 may be used to determine what data to collect. At step 330, process 300 collects application or system crash data based on the determined data to collect at step 320. Data may be collected at step 330 in any suitable format, e.g., a file, data objects, data rows in a data repository, etc.

At step 340, data collected at step 330 is communicated to a crash report management system, e.g., CRM system 220 of system 200. Data communicated at step 340 may be only partially communicated to CRM system 220. The data communicated at step 340 may be deferred and may be sent using a particular network channel. Step 340 may take into account one or more of the rules accessed at step 310 in determining what, how much, and when to send data and over what network channel to transmit the data.

Figure 4:
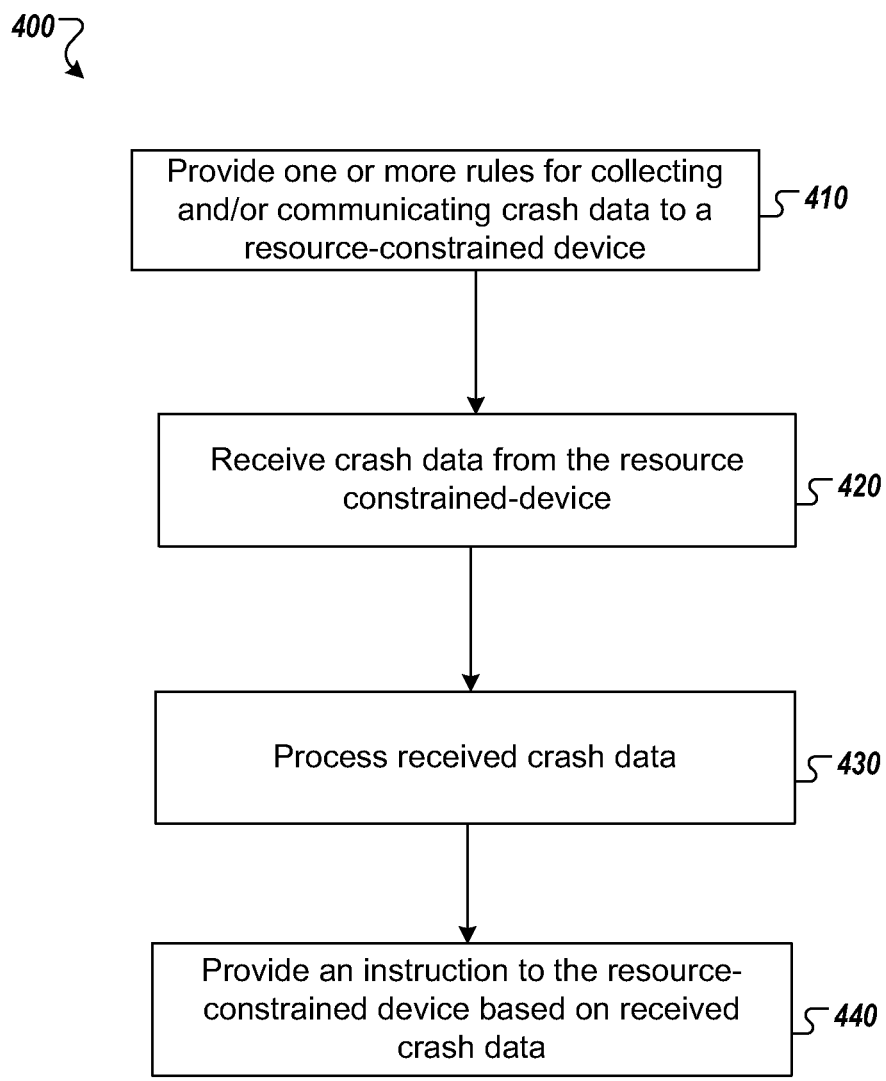
FIG. 4 is another flow chart that shows an example of a process for crash data collection on resource-constrained devices.

FIG. 4 is another flow chart that shows an example of a process 400 for crash data collection on resource-constrained devices. Process 400 is associated with a CRM system, e.g., CRM system 220 of system 200. However, process 400 is not limited to such a system/configuration. At step 410, process 400 provides one or more rules for collecting and/or communicating crash data to a resource-constrained device. The rules provided at step 410 may be provided for example by a crash data rules module 224 of CRM system 220 to a client rules module 244 of CRC system 240. The rules provided may of any type of rules, e.g., as described above—a pre-emptive and/or adaptive filtering crash reporting rule, a power-aware crash reporting rule, a network-aware crash reporting rule, a memory-aware crash reporting rule, a user attention analysis crash reporting rule, or any other type of rule helpful for crash reporting on RCDs.

At step 420, process 400 receives crash data from the resource-constrained device. RCD may have used one or more of the rules provided to it at step 410 in collecting and sending the data to a CRM system at step 420 (see above description for process 300 of FIG. 3). The crash data received at step 410 may also have used one or more rules on a RCD (e.g., via a client rules module 244) that were provided to the RCD via another source (e.g., a user, a CRC system, or another CRM system) other than provided at step 410.

At step 430, the received crash data is processed. In some aspects, step 430 may simply store the received crash data in, e.g., a data repository 110. The stored crash data may later be used by the CRM system 220 and/or the CRC system 240. In other aspects, at step 430, the received crash data is analyzed, perhaps along with other crash data previously received. The analysis may lead to the addition, modification, or deletion of a crash reporting system rule. Such a rule may be communicated to the RCD that provided the data received at step 420 and/or to other RCDs.

At step 440, the analysis at step 430 may lead to process 400 providing an instruction to the RCD that sent the crash data. The instruction may be to collect different kinds of data, to communicate data using a different channel, to terminate one or more processes or applications, or any other suitable instruction for managing crash reporting on RCDs. An RCD that receives instructions provided at step 440 may take an appropriate action based on the received instruction. In some cases, a user preference may override an instruction provided at step 440. In other cases, a system rule or instruction may override a user preference (e.g., in critical events such as loss of application data).

Figure 5:
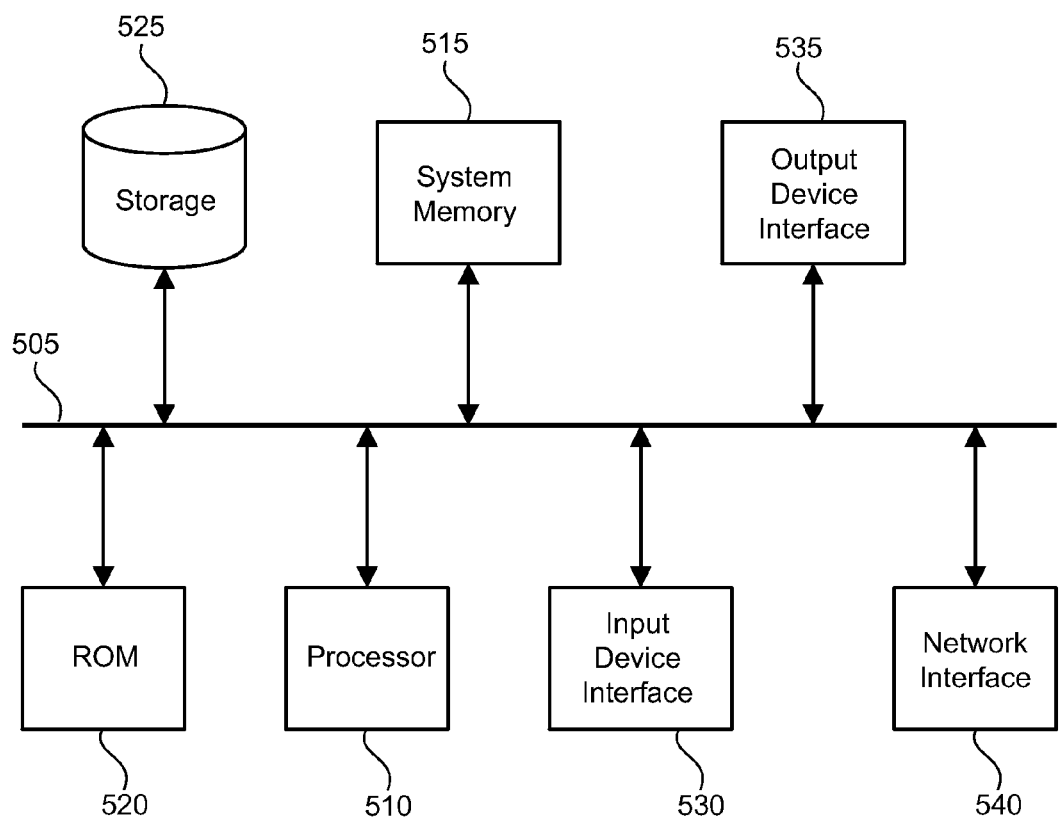
FIG. 5 conceptually illustrates an example electronic system with which some implementations of the subject technology are implemented.

FIG. 5 conceptually illustrates an electronic system 500 with which some implementations of the subject technology are implemented. For example, one or more of the data repository 110, the server 120, or the resource-constrained device 130 of FIG. 1 may be implemented using the arrangement of the electronic system 500. The electronic system 500 can be a computer (e.g., a mobile phone, PDA), or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the subject technology use a mass-storage device (for example a magnetic or optical disk and its corresponding disk drive) as the permanent storage device 525.

Other implementations use a removable storage device (for example a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, or the read-only memory 520. For example, the various memory units include instructions for crash reporting systems in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, for example cathode ray tubes (CRT) or liquid crystal displays (LCD). Some implementations include devices for example a touchscreen that functions as both input and output devices.

Finally, as shown in FIG. 5, bus 505 also couples electronic system 500 to a network (not shown) through a network interface 540. In this manner, the electronic system 500 can be a part of a network of computers (for example a local area network ("LAN"), a wide area network ("WAN"), or an Intranet, or a network of networks, for example the Internet. Any or all components of electronic system 500 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for crash reporting for resource-constrained devices, the method comprising:
   accessing one or more rules for crash data management upon an application crash on a resource-constrained device, wherein the one or more accessed rules take into account at least one resource constraint of the resource-constrained device;
   collecting crash data using a processor; and
   communicating the crash data to a crash report management system, wherein at least one of the collecting the crash data or the communicating the crash data is based on the one or more accessed rules,
   wherein when the collecting of the crash data is based on the one or more accessed rules, then the one or more accessed rules define at least one of an amount of crash data to be collected, what crash data is to be collected, how the crash data is to be collected, and a format in which the crash data is to be collected,
   wherein the one or more accessed rules comprise a rule which takes into account a power constraint of the resource-constrained device.

2. The method of claim 1, wherein the one or more accessed rules comprise a user-defined rule.

3. The method of claim 1, wherein the one or more accessed rules comprise a system provided rule.

4. The method of claim 1, wherein the one or more accessed rules comprise a rule which takes into account a network bandwidth constraint of the resource-constrained device.

5. The method of claim 1, wherein the one or more accessed rules comprise a rule which takes into account a memory constraint of the resource-constrained device.

6. The method of claim 1, wherein the one or more accessed rules comprise a rule which takes into account a transmission power consumption constraint.

7. The method of claim 1, wherein the one or more accessed rules comprise a rule which takes into account a user attention level constraint of the resource-constrained device.

8. The method of claim 1, wherein the one or more accessed rules comprise a rule specific to an application running on the resource-constrained device.

9. The method of claim 1, wherein the one or more accessed rules comprise a rule based on analysis of previously communicated collected crash data to the crash management system by one or more resource-constrained devices.

10. The method of claim 9, wherein the analysis of previously communicated crash data is based on previously communicated crash data for a particular crashing application on the resource-constrained device.

11. The method of claim 9, wherein the analysis of previously communicated crash data is based on previously communicated crash data for a plurality of applications from the resource-constrained device.

12. The method of claim 1, further comprising:
   receiving an instruction from the crash report management system based on the communicated collected crash data; and
   performing an action on the resource-constrained device based on the received instruction from the crash report management system.

13. A computer-readable medium storing instructions that when executed cause a computer to perform operations for crash reporting for resource-constrained devices, the operations comprising:

provided one or more rules to a resource-constrained device for an application crash associated with an application running on the resource-constrained device; and receiving crash data from the resource-constrained device, wherein the received crash data was collected or communicated by the resource-constrained device based on at least one of the one or more rules provided to the resource-constrained device, wherein when the collecting of the crash data is based on the one or more accessed rules, then the one or more accessed rules define at least one of an amount of crash data to be collected, what crash data is to be collected, how the crash data is to be collected, and a format in which the crash data is to be collected, wherein the one or more provided rules comprise a rule which takes into account a power consumption level constraint of the resource-constrained device.

14. The computer-readable medium of claim 13, further comprising:

providing an instruction to the resource-constrained device based on the received crash data, wherein the instruction is for the resource-constrained device to take an action on the resource-constrained device in response to the received crash data.

15. The computer-readable medium of claim 13, wherein the one or more provided rules comprise a rule which takes into account a network bandwidth constraint of the resource-constrained device.

16. The computer-readable medium of claim 13, wherein the one or more provided rules comprise a rule which takes into a memory constraint of the resource-constrained device.

17. A computer-implemented system for crash reporting for resource-constrained devices, the system comprising:

one or more processors; and a memory comprising instructions which, when executed by the one or more processors, cause the one or more processors to:

collect crash data upon an application crash;

access a rule for handling a crash on a resource-constrained device, wherein the accessed rule provides a communication rule based on at least one resource constraint of the resource-constrained device, wherein the accessed rule comprises a rule which takes into account a power constraint of the resource-constrained device;

communicate at least a portion of the collected crash data to a remote crash report management system based on the accessed rule.

18. The system of claim 17, further comprising instructions to:

receive an instruction from the crash report management system based on the communicated portion of collected crash data; and take an action on the resource-constrained device based on the received instruction from the crash report management system.

* * * * *